(12) United States Patent
Khan et al.

(10) Patent No.: US 7,590,864 B2
(45) Date of Patent: Sep. 15, 2009

(54) TRUSTED PATCHING OF TRUSTED CODE

(75) Inventors: Moinul H. Khan, Austin, TX (US);
Anitha Kona, Austin, TX (US); Mark N. Fullerton, Austin, TX (US); David M. Wheeler, Gilbert, AZ (US); John P. Brizek, Placerville, CA (US)

(73) Assignee: Intel Corporation, Santa Clara, CA (US)

( * ) Notice: Subject to any disclaimer, the term of this patent is extended or adjusted under 35 U.S.C. 154(b) by 847 days.

(21) Appl. No.: 10/851,305

(22) Filed: May 21, 2004

(65) Prior Publication Data

US 2005/0262360 A1    Nov. 24, 2005

(51) Int. Cl.
G06F 12/14    (2006.01)

(52) U.S. Cl. .............................. 713/189; 711/100; 707/9

(58) Field of Classification Search ................. 713/189;
235/487, 492; 380/29; 711/100, 1, 203, 711/152, 163, 5; 717/132; 707/9
See application file for complete search history.

(56) References Cited

U.S. PATENT DOCUMENTS

| | | | | |
|---|---|---|---|---|
| 4,280,176 | A * | 7/1981 | Tan | 711/5 |
| 5,802,549 | A * | 9/1998 | Goyal et al. | 711/102 |
| 6,338,435 | B1 * | 1/2002 | Carper | 235/487 |
| 6,615,307 | B1 * | 9/2003 | Roohparvar | 711/103 |
| 6,986,006 | B2 * | 1/2006 | Willman et al. | 711/152 |
| 2005/0132186 | A1 | 6/2005 | Khan et al. | |
| 2005/0132226 | A1 | 6/2005 | Wheeler et al. | |

* cited by examiner

*Primary Examiner*—Thanhnga B Truong
(74) *Attorney, Agent, or Firm*—Trop, Pruner & Hu, P.C.

(57) ABSTRACT

Trusted code may be patched in a manner that resists tampering from non-trusted sources. In some embodiments, the patches may be moved into a patch cache in a trusted processing module for execution.

18 Claims, 5 Drawing Sheets

TRUSTED PATCHING OF TRUSTED CODE

BACKGROUND

The ability to provide the relative security of trusted processing has become more important in computer and communications technologies, but the need still exists to maintain the flexibility and accessibility of non-trusted processing for most applications. One approach to integrating these two seemingly conflicting requirements is to provide a separate co-processor for the trusted processing. To make sure the trusted operations are not tampered with, the trusted code may be implemented in read-only memory (ROM) that is programmed during manufacturing and cannot be subsequently re-written. However, errors discovered later in the original code, as well as new requirements that are developed later, may create a need to modify the trusted code through the use of patches. This may create a problem because common methods of patching involve putting the patches in an external random access memory (RAM) and trapping execution of the code at certain locations to cause execution to branch to the patch RAM. The exposure of the patch RAM to malicious or inadvertent tampering may seriously compromise the integrity of the trusted ROM-based code.

BRIEF DESCRIPTION OF THE DRAWINGS

The method by referring to the following description and accompanying drawings are used to illustrate embodiments of the invention. In the drawings.

DETAILED DESCRIPTION

Figure 1:
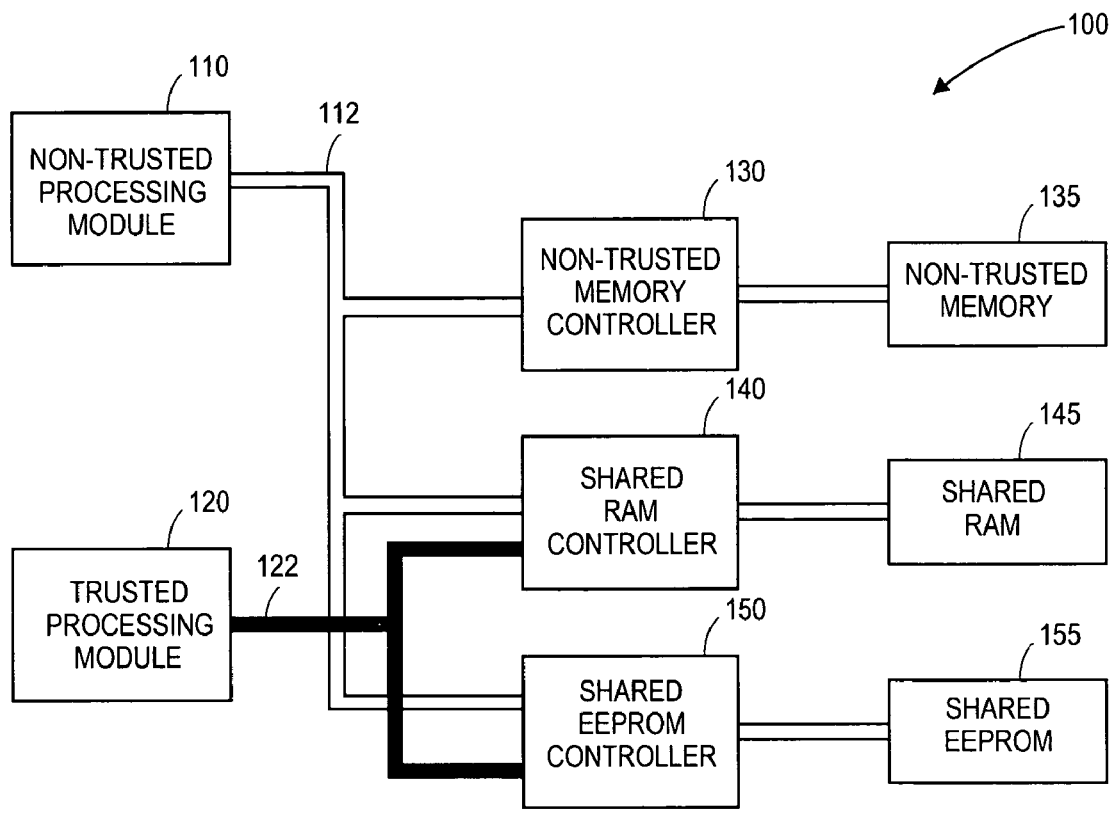
FIG. 1 shows a block diagram of a system using both trusted and non-trusted components, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

As used herein, unless otherwise indicated the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

The term "trusted" may be used herein to imply a relative level of protection of data, or activities that process and/or store that data, from access and/or modification by parties other than those intended to perform such accesses and/or modifications. The term does not imply absolute protection under all circumstances, or specify any particular level of protection.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

Various embodiments of the invention may be used to implement patching of trusted code that may be executed within a trusted processing module, using patches stored outside the trusted processing module. In some embodiments a patch cache may be used to temporarily hold the patches for execution.

FIG. 1 shows a block diagram of a system 100 using both trusted and non-trusted components, according to an embodiment of the invention. In the illustrated embodiment, trusted processing module 120 may be used to perform trusted processing and may comprise such items (not shown in FIG. 1) as a processor, a memory for instructions and/or data, a cache memory to improve processing speed, input-output (I/O) control circuitry, and other circuitry as needed. Non-trusted processing module 110 (the 'non-trusted' label merely implies that processing in module 110 does not have to meet the same level of protection as in module 120) may comprise such items (not shown in FIG. 1) as a processor, cache memory, main memory, I/O control circuitry, and/or other circuitry as needed. The use of a dedicated processing module for trusted processing may simplify overall system design by allowing the system to perform both trusted and non-trusted processing, without having to add safeguards throughout the system to protect the trusted processing.

In addition to the processing modules 110, 120, FIG. 1 also shows storage elements in the form of non-trusted memory 135, shared RAM 145, shared EEPROM 155, associated controllers 130, 140, and 150 respectively, memory bus 112 to couple those storage elements to the non-trusted processing module 110, and private bus 122 to couple at least some of those storage elements to the trusted processing module 120. "Non-trusted" storage element 135 is so-named to indicate it may not be used for trusted operations, while "shared" storage elements 145, 155 are so named to indicate they may be available for both trusted and non-trusted operations. However, controllers 140, 150 may be configured so that certain areas of storage elements 145, 155 are accessible only by trusted processing module 120 and are therefore considered trusted storage areas. In some embodiments, shared EEPROM 155 may comprise a flash memory, shared RAM 145 may comprise a volatile memory, and non-trusted memory 135 may comprise RAM, ROM, EEPROM, other memory types, and/or any combination thereof, but the invention is not limited in these respects.

In some embodiments, memory controllers 140, 150 may have the capability to distinguish between access requests from trusted processing module 120 and access requests from other, non-trusted requesters such as processing module 110, and to prevent those non-trusted requesters from accessing the portions of memories 145, 155 that have been designated as trusted areas. In particular embodiments, the protected portions of memories 145, 155 may be used only by trusted processing module 120, while other portions of memories 145, 155 may be used by both processing modules, and may also be used to transfer data between the two processing modules. In this manner, data and/or instruction that are passed to trusted processing module 120 from non-trusted sources may be validated by trusted processing module 120 in a protected area before being used.

In some other embodiments, all portions of memories 145, 155 may be accessible to both processing modules, and the instructions and/or data from non-trusted sources may be validated after being transferred into trusted processing module 120 but before being used by trusted processing module 120.

Figure 2:
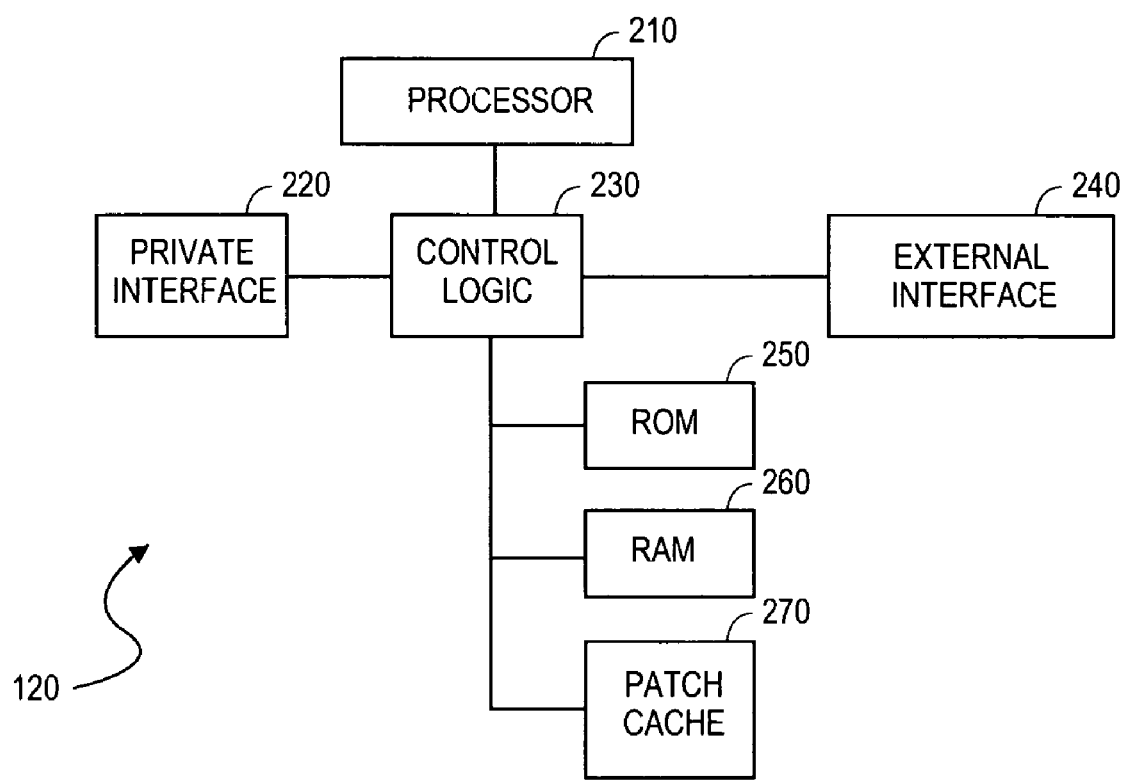
FIG. 2 shows a block diagram of a trusted processing module, according to an embodiment of the invention.

FIG. 2 shows a block diagram of a trusted module, according to an embodiment of the invention. In the illustrated example, trusted processing module 120 may comprise a trusted processor 210, control logic 230 to control communications between that processor and other devices, private interface 220 to provide I/O control over private bus 122 (reference FIG. 1), external interface 240 to provide I/O control between trusted processing module 120 and various other devices, ROM 250, RAM 260, and patch cache 270 which may be used to temporarily hold patches for code scheduled for execution from ROM 250. Other embodiments may contain more, fewer, or different elements than shown in FIG. 2.

Figure 3:
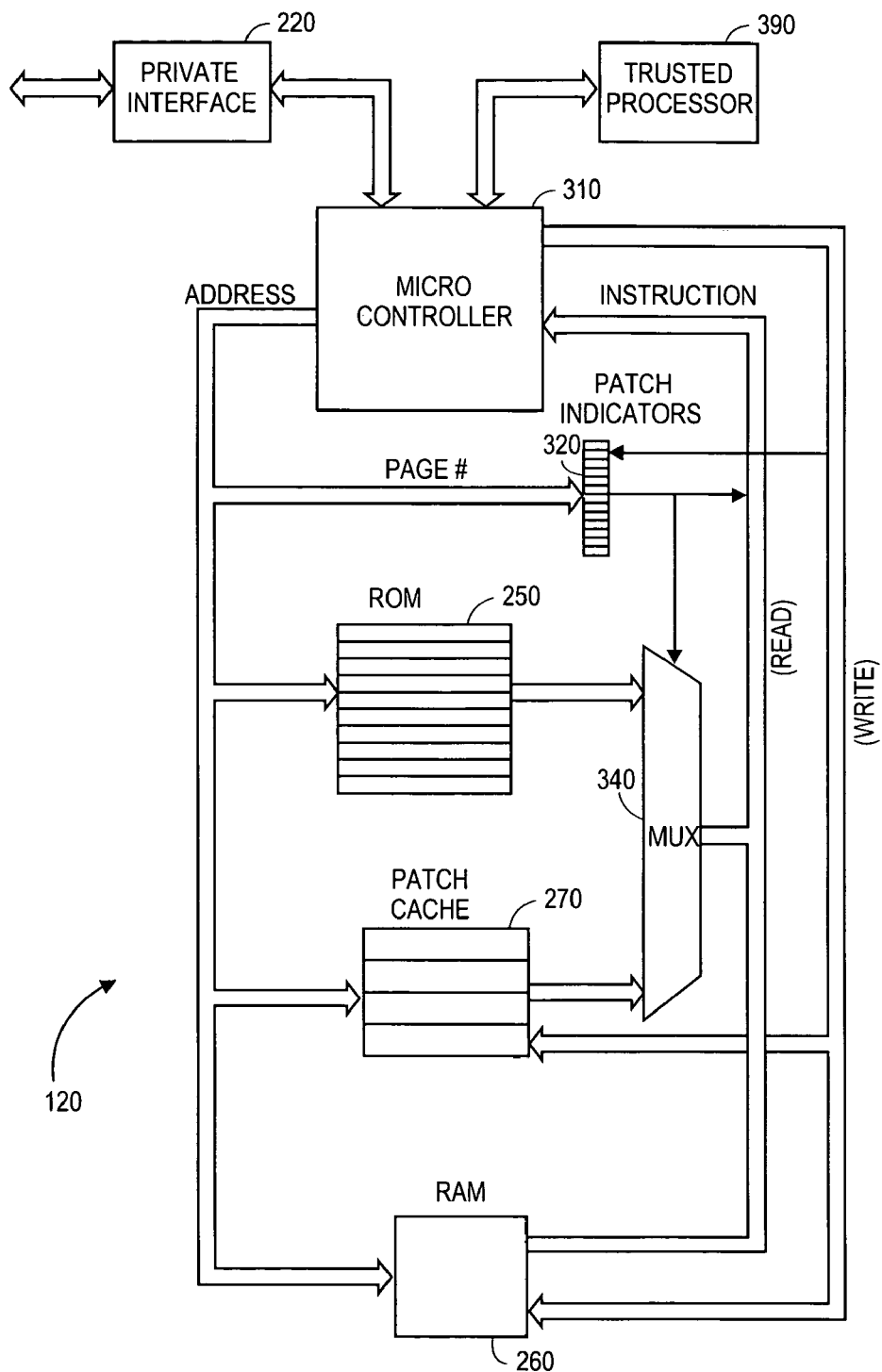
FIG. 3 shows a block diagram of logic components for trusted patching, according to an embodiment of the invention.

FIG. 3 shows a block diagram of logic components for trusted patching, according to an embodiment of the invention. Components indicated with a 2xx designation in FIG. 3 may be the same or similar to like-numbered components in FIG. 2, while components indicated with a 3xx designation in FIG. 3 may be fully or partially contained within a component shown in FIG. 2 or may not be shown in FIG. 2, although the invention is not limited in these respects. Referring to the specifics of FIG. 3, ROM 250 may contain instructions for execution by trusted processor 390, while RAM 260 may be used for data being operated upon by those instructions. In some embodiments ROM 250 may also contain static data that is not intended to change during the operational lifetime of the system, although the invention is not limited in this respect.

Private interface 220 may permit the trusted processing module 120 to communicate with ROM and/or RAM outside the trusted module, e.g., over the private bus 122 previously described. The system may be configured so that communications over this private bus 122 will be protected from observation and/or tampering by devices not considered trusted, although various embodiments of the invention are not limited in this respect.

Micro controller 310 may comprise circuitry to control all communications between the illustrated components shown in FIG. 3, although various embodiments of the invention are not limited in this respect. Trusted processing module 120 may also include patch cache 270 to temporarily contain patches for execution, a multiplexer 340 to select either the ROM 250 or the patch cache 270 as a source for instructions to be executed, and patch indicators 320 to control the patch execution. Patch indicators 320 may include indicators of which portions of ROM 250 have associated patches, where each patch may be retrieved from outside the trusted module, and where each retrieved patch is located in patch cache 270. Although shown as being in a single entity, these various indicators may also be distributed among different parts of trusted processing module 120 and/or may be separately controlled. The illustrated embodiment of FIG. 3 shows separate buses for reading and writing to the ROM, RAM, patch cache and patch indicators, but other embodiments may use a single bi-directional bus for both reading and writing, and/or may use separate communication paths for the different devices.

In some embodiments the various storage elements may be organized into 1-page boundaries, with a page containing 256 consecutively-addressed bytes, but other embodiments may be organized differently. A particular embodiment may be organized as follows, thought the scope of other embodiments may not be limited in this respect:

1) The memory space in ROM 250 may be organized into pages, with patch indicators 320 having an associated entry for each ROM page.
2) Patch cache 270 may be organized into pages (e.g., four pages).
3) Each patch may be one page in length, and be substituted in whole for its corresponding ROM page for execution. In the event that a patch requires more than one page of space, it may be treated as multiple related pages that are placed into multiple pages of the patch cache for execution.

4) For each ROM page, the corresponding entry in the patch indicators 320 may include:
   a) An indicator of whether that ROM page has an associated patch. This indicator may be represented by a single bit, which may be used to switch the multiplexer 340 to the correct input, although the invention is not limited in this respect.
   b) An indicator of which page in the patch cache 270 contains the patch, if the patch is already in the patch cache.
   c) An indicator of the address of the patch in its storage location (e.g., in the shared EEPROM 155 of FIG. 1), if the patch is not already in the patch cache.

Figure 4:
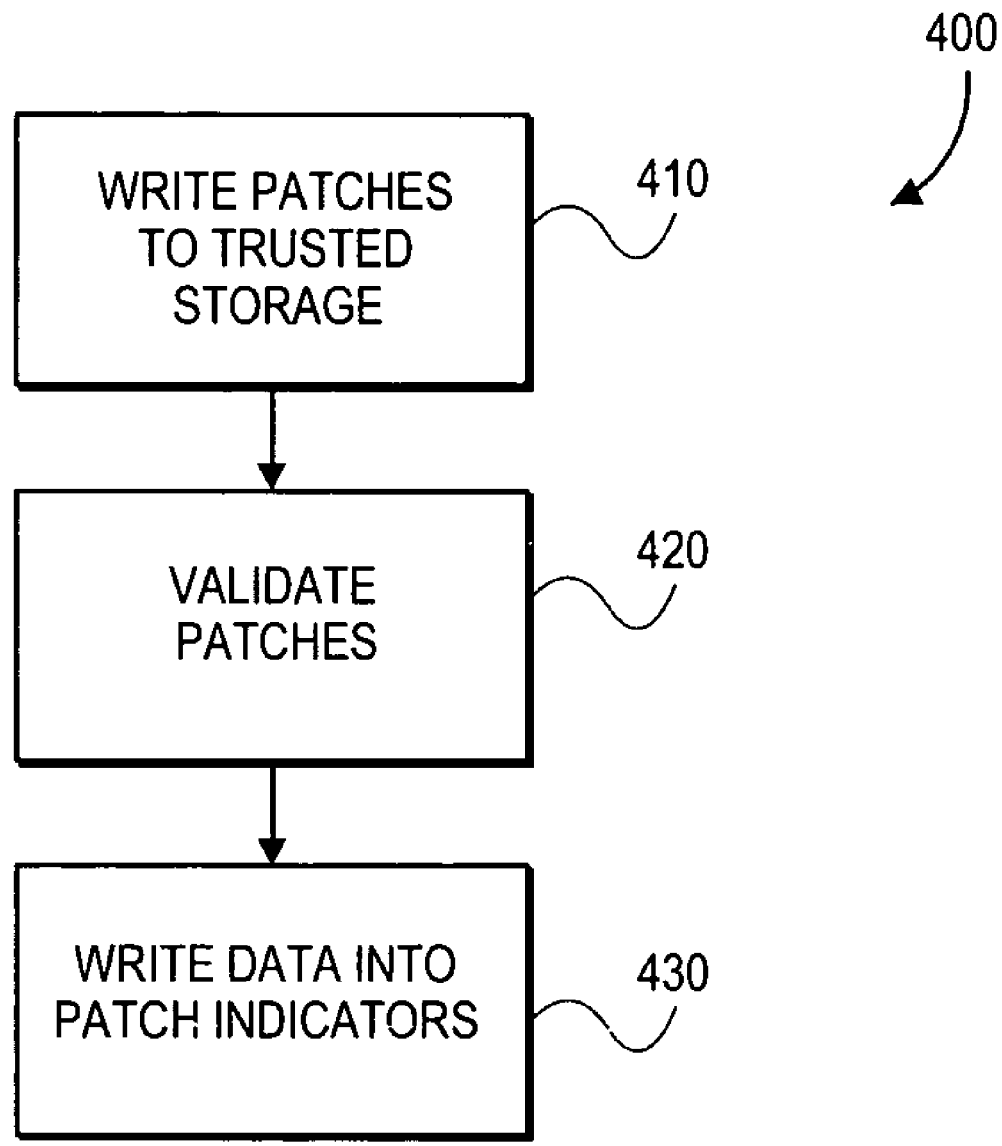
FIG. 4 shows a flow chart of a method of placing patches into storage, according to an embodiment of the invention.

FIG. 4 shows a flow chart of a method of placing patches into storage, according to an embodiment of the invention. The flow chart 400 assumes that the patches have already been created. At 410 the patches are written into trusted storage (e.g., into portions of shared RAM 145 or shared EEPROM 155 that are accessible to trusted processing module 120 but not to non-trusted processing module 110 or to non-trusted DMA accesses). In some embodiments the patches may be validated by the trusted processing module at 420 through any feasible means, such as a digital signature, but the invention is not limited in this respect. Next, at 430 the associated indicators for which ROM pages are being patched, and what address each patch has been stored at, may be written into patch indicators 320.

Figure 5:
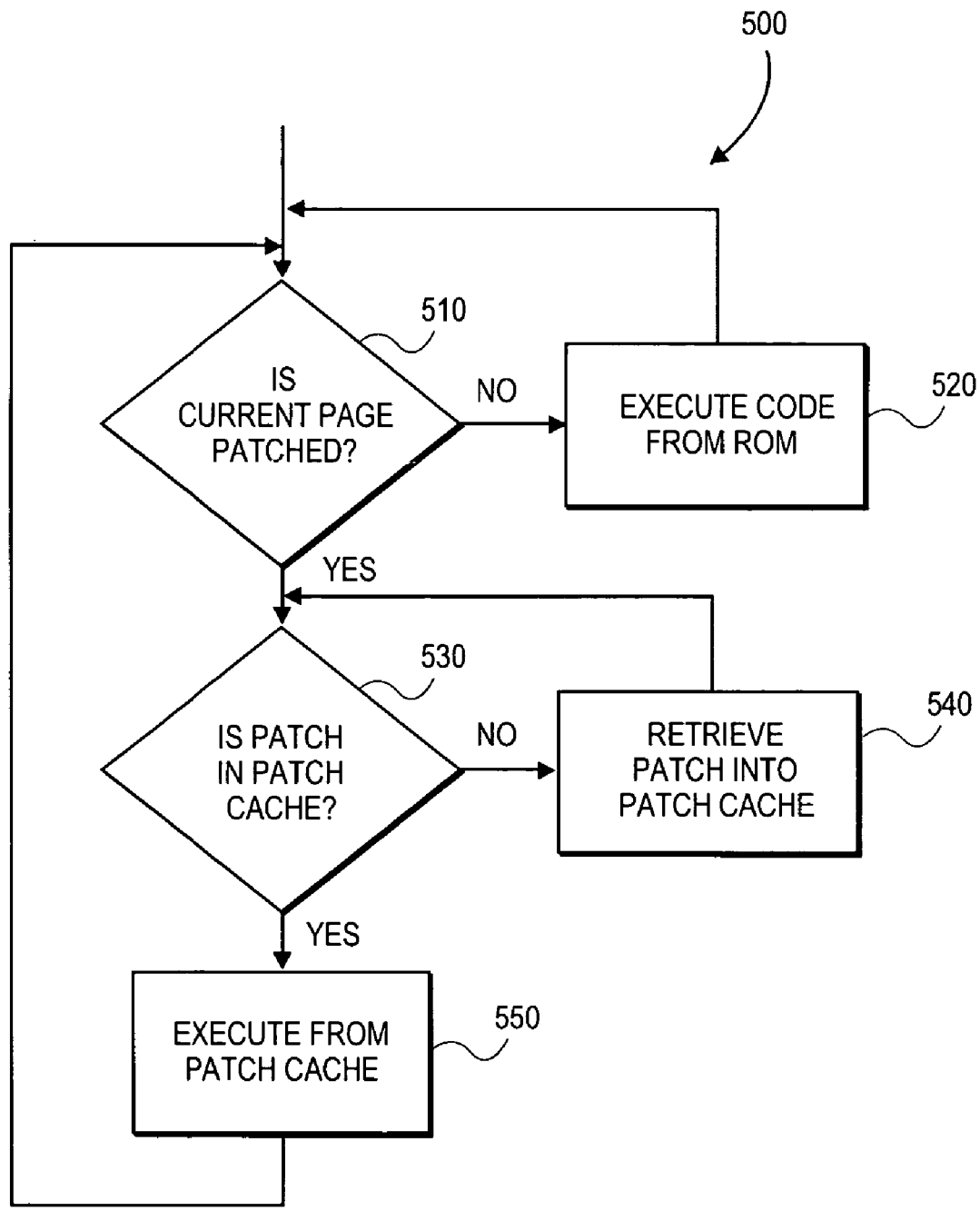
FIG. 5 shows a flow chart of a method of executing patched code, according to an embodiment of the invention.

FIG. 5 shows a flow chart of a method of executing patched code, according to an embodiment of the invention. In flow chart 500, it may first be determined at 510 whether the current page (e.g., the page from which the next instruction is to be executed) has a corresponding patch. If not, the instruction may be executed from ROM at 520 before returning to 510 to make the same decision for the next instruction. In some embodiments this decision may be made before the execution of each individual instruction, while in other embodiments this decision may be made once before each block of multiple instructions, where the blocks may be defined in any feasible manner. Whether or not a page has a corresponding patch may be determined from the patch indicators for the current page, and may be determined as the address for each instruction (or data, if data and instructions are mixed within the ROM address space) is determined. If it is determined at 510 that the current page has been patched, it may then be determined at 530 whether the patch for that page is currently in the patch cache. If not, at 540 the patch may be retrieved from its storage location (e.g., from a trusted boot block of the shared EEPROM 155 in FIG. 1, though various embodiments of the invention may not be limited in this manner) and placed into the patch cache. A trusted boot block may be a block of shared EEPROM 155 which is accessible only by the trusted processing module 120, and which may contain boot code for the trusted processing module 120. In some embodiments, the retrieval process may also include validating the patch to verify the patch is valid. At 550 the patch may be executed from the patch cache rather than executing the original code from the ROM. In some embodiments this entire loop may be repeated for each instruction, while in other embodiments it may be repeated for each block of instructions, with the blocks being defined in any feasible manner.

In some embodiments, patch code may be substituted for original ROM code in entire blocks, such as pages, even though much of the code in the patch may be identical to the original code. In some embodiments, the patch code for a single page of original code may occupy multiple pages of patch code. In some embodiments, execution of patch code may execute past the end of the cache page through simple linear execution, while in some embodiments execution may be directed to leave the cache page through an instruction that causes non-linear execution, such as a branch or conditional branch instruction. In some embodiments, all of these situations may be handled by simply examining the page (or other designated block size) in which the instruction is located and following the indicated process. In some embodiments using pipelined instruction retrieval, the 'current' instruction may be an instruction that is being retrieved for future execution, and may even be retrieved on a speculative basis.

The foregoing description is intended to be illustrative and not limiting. Variations will occur to those of skill in the art. Those variations are intended to be included in the various embodiments of the invention, which are limited only by the spirit and scope of the appended claims.

What is claimed is:

1. An apparatus, comprising:
   a trusted processing module comprising a first storage element to contain code for execution and a second storage element to contain patches for the execution of the code;
   a third storage element, coupled to the trusted processing module, to store the patches to be loaded into the second storage element;
   a controller coupled between the trusted processing module and the third storage element, the controller adapted to enable access to the third storage element by the trusted processing module and by a processor external to the trusted processing module, the controller further adapted to enable a selected area of the third storage element to be accessed by the trusted processing module while preventing access by the processor to the selected area; and
   circuitry to transfer a particular patch from the third storage element to the second storage element for execution, responsive to determination that the particular patch is a patch for a block of code to be executed from the first storage element.

2. The apparatus of claim 1, wherein the first storage element comprises a read-only memory.

3. The apparatus of claim 1, wherein the second storage element comprises a cache memory.

4. The apparatus of claim 1, wherein the third storage element comprises a flash memory.

5. The apparatus of claim 1, wherein the selected area comprises a trusted boot block for the trusted processing module.

6. The apparatus of claim 1, further comprising a fourth storage element to contain indicators to indicate which portions of the code in the first storage element have corresponding patches in the second storage element.

7. A system, comprising:
   a first processor for trusted processing;
   a second processor;
   a non-volatile first memory coupled to the first processor, the first memory accessible to the first processor and not accessible to the second processor;
   a second memory coupled to the first and second processors and accessible by the first and second processors, the second memory to contain a patch for code in the first memory;
   circuitry to transfer the patch from the second memory to a cache memory for execution by the first processor responsive to determination that the patch is to be executed in place of a block of the code in the first memory;

a volatile third memory coupled to the second processor and not coupled to the first processor, the third memory to contain code for execution by the second processor; and the second processor coupled between the first memory and the third memory, the second processor adapted to enable access to the third memory by the first and second processors, the second processor further adapted to enable a selected area of the third memory to be accessed by the first processor while preventing access to the selected area by the second processor.

8. The system of claim 7, wherein the second memory is to contain a trusted boot block comprising the patch.

9. The system of claim 7, wherein the block of the code has a size of one page and the patch has a size of one page.

10. The system of claim 7, wherein:
the first memory is to contain multiple blocks of code;
the second memory is to contain multiple patches; and
the system further comprises a storage element to contain indicators to indicate whether each of the multiple blocks of code has a corresponding patch in the second memory.

11. A method, comprising:
executing code in a read-only memory of a trusted processing module;
determining that a block of the code has an associated patch; transferring the patch from a first storage element external to the trusted processing module to a second storage element internal to the trusted processing module;
executing the patch rather than the block of code;
enabling access to the first storage element by a trusted processing module and by a processor external to the trusted processing module;
enabling a selected area of the first storage element to be accessed by the trusted processing module; and
preventing access by the processor to the selected area.

12. The method of claim 11, wherein said transferring to a second storage element comprises transferring to a patch cache.

13. The method of claim 11, further comprising validating the patch prior to said transferring and prior to said executing.

14. The method of claim 11, further comprising validating the patch subsequent to said transferring and prior to said executing.

15. An article comprising
a tangible computer-readable medium that provides instructions, which when executed by a computing platform, cause said computing platform to perform operations comprising:
validating a patch for a block of trusted code in a trusted processing module;
storing the patch of code in a memory external to the trusted processing module;
storing an indicator of the patch in the trusted processing module;
transferring the patch into the trusted processing module for execution;
enabling access to the second storage element by a trusted processing module and by a processor external to the trusted processing module;
enabling a selected area of the second storage element to be accessed by the trusted processing module; and
preventing access by the processor to the selected area.

16. The article of claim 15, wherein said validating occurs prior to said transferring.

17. The article of claim 15, wherein said validating occurs subsequent to said transferring.

18. The article of claim 15, further comprising determining, subsequent to said storing the patch of code and prior to said transferring, that the patch is associated with a block of code scheduled for execution in the trusted processing module.

* * * * *

UNITED STATES PATENT AND TRADEMARK OFFICE
CERTIFICATE OF CORRECTION

PATENT NO. : 7,590,864 B2  Page 1 of 1
APPLICATION NO. : 10/851305
DATED : September 15, 2009
INVENTOR(S) : Khan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1092 days.

Signed and Sealed this

Twenty-first Day of September, 2010

David J. Kappos
*Director of the United States Patent and Trademark Office*